(12) United States Patent
Moffitt, II et al.

(10) Patent No.: US 8,218,280 B2
(45) Date of Patent: Jul. 10, 2012

(54) SECONDARY THERMAL SENSOR FOR PRIMARY CONDUCTORS

(75) Inventors: Ryan James Moffitt, II, Coralville, IA (US); Richard Allen Studer, II, Wesley, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 111 days.

(21) Appl. No.: 12/832,801

(22) Filed: Jul. 8, 2010

(65) Prior Publication Data

US 2012/0008245 A1    Jan. 12, 2012

(51) Int. Cl.
*H02H 5/04* (2006.01)
(52) U.S. Cl. ........................................ 361/93.8
(58) Field of Classification Search .............. 361/93.8
See application file for complete search history.

(56) References Cited

U.S. PATENT DOCUMENTS

| | | | | |
|---|---|---|---|---|
| 3,300,685 A | * | 1/1967 | Zocholl | 361/94 |
| 3,319,127 A | * | 5/1967 | Zocholl | 361/96 |
| 4,054,934 A | | 10/1977 | Riebs | |
| 4,914,386 A | * | 4/1990 | Zocholl | 324/545 |
| 5,222,009 A | * | 6/1993 | Scharnick et al. | 361/28 |
| 5,283,708 A | * | 2/1994 | Waltz | 361/93.8 |
| 5,418,677 A | * | 5/1995 | Engel | 361/25 |
| 5,585,995 A | | 12/1996 | Baurand et al. | |
| 6,563,685 B2 | * | 5/2003 | Gotzig | 361/187 |
| 7,565,258 B2 | | 7/2009 | Duarte | |
| 7,606,674 B2 | | 10/2009 | Jung | |
| 7,609,195 B2 | | 10/2009 | Jeong | |
| 7,619,889 B2 | | 11/2009 | Yu et al. | |
| 2004/0252421 A1 | * | 12/2004 | Knox et al. | 361/23 |
| 2012/0008245 A1 | * | 1/2012 | Moffitt et al. | 361/103 |

FOREIGN PATENT DOCUMENTS

EP   0642198 A1   3/1995
EP   1231695 A2   8/2002

OTHER PUBLICATIONS

International Search Report corresponding to co-pending International Patent Application Serial No. PCT/US2011/042803, European Patent Office, dated Nov. 30, 2011; (4 pages).
International Written Opinion corresponding to co-pending International Patent Application Serial No. PCT/US2011/042803, European Patent Office, dated Nov. 30, 2011; (5 pages).

* cited by examiner

*Primary Examiner* — Ronald W Leja
(74) *Attorney, Agent, or Firm* — Nixon Peabody LLP

(57) ABSTRACT

A thermal sensing system for providing thermal protection to an electronic circuit breaker that does not require any additional components. The layout of the conductive traces on the printed circuit board are dimensioned and configured so that the ratio of primary current to primary conductor thermal mass heating is correlated with the ratio of secondary current to secondary thermal mass heating. A voltage at a semiconductor junction in the rectifier behind the secondary transformer is measured, and a temperature or heat is calculated based on the voltage. Because this temperature or heat calculation is correlated with the temperature or heat of the primary conductor, a trip routine can be added based on the measured voltage for thermal protection of the primary conductors. A thermal history of the 'primary thermal mass' is also provided for robust thermal protection of the circuit breaker load and primary conductors.

19 Claims, 2 Drawing Sheets

SECONDARY THERMAL SENSOR FOR PRIMARY CONDUCTORS

FIELD OF THE INVENTION

The present disclosure relates generally to electronic circuit breakers, and, more particularly, to an electronic circuit breaker having a thermal sensor coupled to a secondary conductor to model primary conductor temperature.

BACKGROUND

Electronic circuit breakers have electronic components inside them that require a power supply, which includes a transformer followed by a bridge rectifier that converts the alternating current to a corresponding direct current. When turned on and current is flowing through the circuit breaker, it provides thermal protection as it monitors the current passing through the circuit breaker to a load being protected by the circuit breaker. Circuit breakers have long provided thermal protection to protect the insulation on the primary conductors. If the primary conductors become too hot, their insulation will melt and its insulating properties will be compromised. A traditional mechanical circuit breaker provides this protection by passing current through a bimetal, which deflects as a function of temperature. When current passes through the bimetal, its heating models that of the primary conductors, which are also carrying current. As typically applied, electronic circuit breakers provide protection by measuring the potential created in a burden resistor when secondary current passes through that resistor. However, the instant the primary current stops flowing, the secondary current drops to zero, but the primary conductors remain at an elevated temperature. If primary current starts to flow again within approximately 15 minutes, significant residual heat remains in the primary conductors, so they are still at an elevated temperature. The mechanical bimetal remains partially deflected until it is totally cooled. If the circuit breaker is powered up when residual heat remains in the primary conductors, the circuit breaker lacks any "memory" of the thermal history of the primary conductors and may not recognize quickly enough that a thermal fault still persists, compromising the integrity of the insulation on the primary conductors.

One approach to modeling thermal memory uses a timer, which assumes that the primary conductors cool at a fixed rate over a given period of time. The timer adds circuit complexity and cannot account for variations in the heating or cooling of the primary conductors such as caused by ambient temperature conditions.

Another approach uses a resistor-capacitor (RC) circuit that holds a voltage proportional to the temperature of the system. The RC circuit adds cost and complexity to the system.

BRIEF SUMMARY

In essence, what is provided in the present disclosure is an elegant, low-cost, easy-to-implement approach to modeling the thermal memory inherently present in the thermal mass of the primary conductors. The temperature of a secondary current path is measured when the circuit breaker powers up to provide a recent history of current flow and its consequent heating in the primary conductors. The electronic circuit breaker would otherwise have no way to determine the initial condition of the primary conductors when it first powers up, without adding separate sensors, which adds complexity and cost to the circuit breaker.

Traces on the printed circuit board used to connect the electronics of the printed circuit board assembly are convenient elements in the secondary circuit (downstream of the secondary winding of the current transformer) where temperature can be measured through the voltage at an existing semiconductor junction without adding significant cost or complexity to the circuit breaker. In its barest form, a small additional amount of conductive material is needed compared to existing designs. Most designs already have a p-n junction somewhere in the secondary current path, so aspects of this disclosure use the existing p-n junction voltage as a temperature sensor.

Advantageously, the circuit breaker disclosed herein uses existing parts in the transformer secondary and the bridge rectifier (or other semiconductor element) to model the heat memory of the primary conductor.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
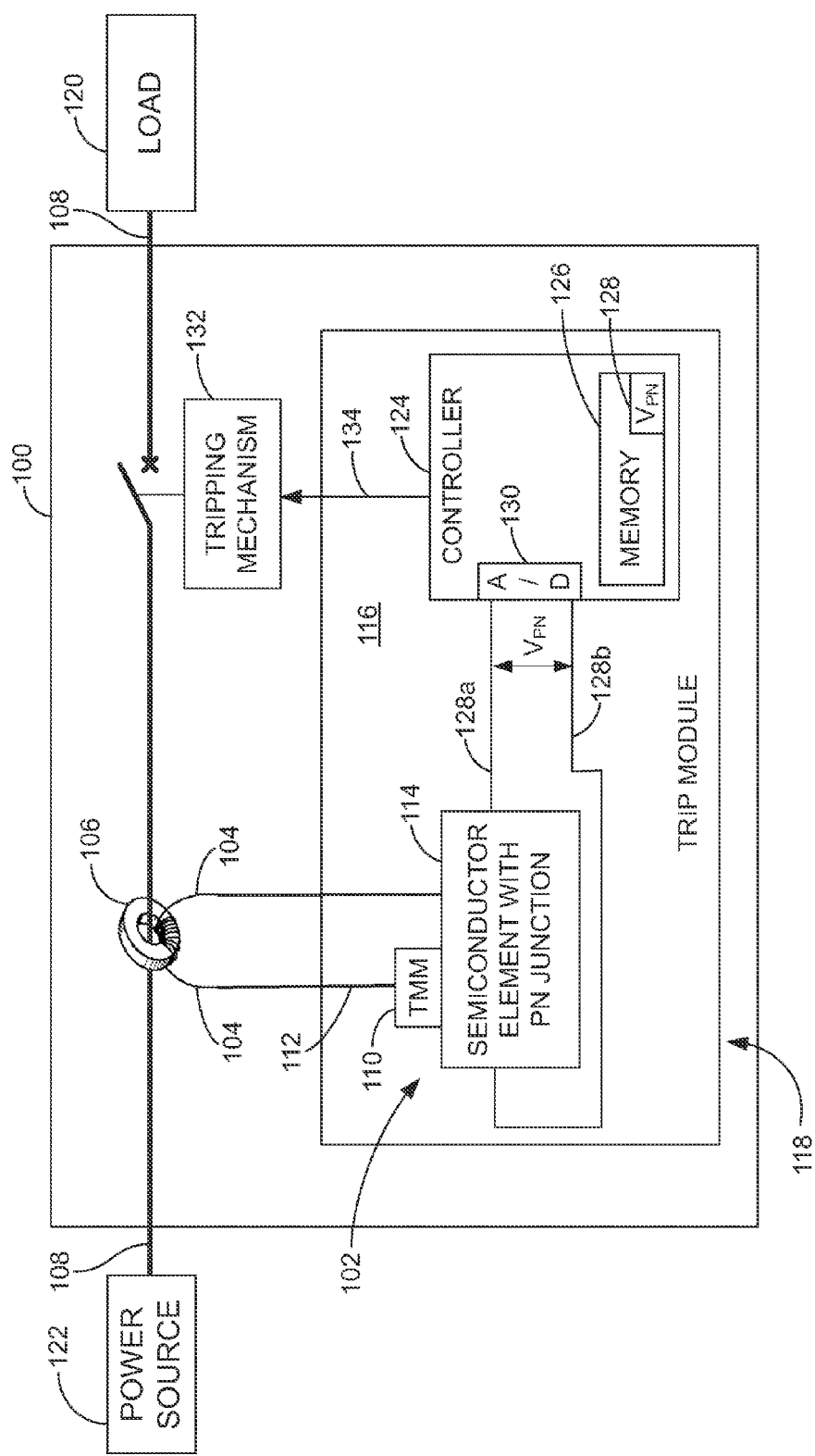
FIG. 1 is a functional diagram of a circuit breaker having a thermal sensor according to an aspect of the present disclosure.

FIG. 1 is a functional block diagram of a circuit breaker 100 having a thermal sensor 102 coupled to a secondary winding 104 of a current transformer 106 for modeling a temperature of a primary conductor 108 carrying primary current to the circuit breaker 100. As is known, the current transformer 106 induces a secondary current proportional to the primary current flowing through the primary conductor 108 passing through the current transformer 106. The return path for the primary current is not shown in FIG. 1 for ease of illustration, but those skilled in the art will readily appreciate that a return conductor (such as a neutral conductor) for the primary current back to a power source 122 is also connected to a load 120 protected by the circuit breaker 100. The primary conductor 108 heats and cools at a rate that is a function of the primary current passing through the primary conductor 108. The heat of the primary conductor 108 is measured in Joules, and the primary conductor 108 has a thermal mass measured in units of Joules per degrees Celsius (or equivalent). The thermal mass is a function of the mass (volume) of the primary conductor 108 and the heat capacity of the conductive material of which the primary conductor 108 is composed (typically copper). Ambient environment can also affect the rate of heating or cooling of the primary conductor 108.

The circuit breaker includes a conductive element 110, also referred to as a thermal mass memory element (abbreviated as TMM in FIG. 1), which is not drawn to scale in FIG. 1 but rather is represented as a box to indicate its general position within the circuit breaker and not to indicate its shape or any dimension thereof. The conductive element 110 is composed of an electrically conductive material, such as copper, and one or more electrically conductive parts. At least a part of the conductive element 110 (which can be composed of multiple parts as described below, all of the parts being composed of a conductive material) is coupled in series to an electrical conductor 112 carrying secondary current from the secondary winding 104 of the current transformer 106 in the circuit breaker 100. The conductive element 110 is dimensioned and positioned relative to the electrical conductor 112 carrying secondary current such that a thermal mass of the conductive element 110 models a rate of heating or cooling in the primary conductor 108. The thermal mass of the conductive element 110 is determined according to a function that includes a ratio of the primary current to the secondary current and a heat capacity of the conductive material. For example, the heat capacity, $C_P$, of copper at 25° C. is 0.385 J/g·K. For example, the ratio of the primary current to the thermal mass of the primary conductor 108 is correlated (e.g., proportional) to the ratio of the secondary current to the thermal mass of the components heated by the secondary current, such as the conductive element 110 and/or the electrical conductor 112.

At least part of the conductive element 110, which can be composed of a unitary or multiple parts, is connected to a semiconductor element 114 having a p-n junction, such as a discrete diode, a diode of a bridge rectifier, a field-effect transistor, or a bipolar junction transistor as explained below. A voltage across the p-n junction of the semiconductor element 114 varies as a function of temperature of the conductive element 110. As mentioned above, the conductive element 110 can be composed of one or more parts. For example, the conductive element 110 can be a unitary square or round pad, which together with the semiconductor element, are disposed on a printed circuit board 116 of a trip module 118 of the circuit breaker 100. Alternately, the conductive element 110 can be composed of multiple, separate parts, all made of a conductive material and positioned relative to the electrical conductor 112 to provide the thermal mass that is correlated with the known thermal mass of the primary conductor 108 based on a ratio of the primary and secondary currents. In other words, although the different parts that make up the conductive element 110 do not necessarily have to be touching one another, they should be positioned sufficiently close to one another that collectively they make up the requisite thermal mass that models the thermal mass of the primary conductor 108. As the secondary current passes through the conductive element 110, the temperature of the conductive element 110 will change commensurate with the amount of current flowing through the secondary winding 104 induced from the primary conductor 108. The goal with the conductive element 110 is to configure it (e.g., dimension the part or parts and position the part or parts close to or in contact with the electrical conductor 112) so that its combined thermal mass can be correlated with the thermal mass of the primary conductor 108 as a function that includes a ratio of the primary and secondary currents. The objective in this example is to obtain a ratio of the thermal masses to be proportional to the ratio of the primary and secondary currents. For example, a ratio of the known thermal mass of the primary conductor 108 to the overall thermal mass of the conductive element 110 (and all of its component parts) is proportional to the ratio of the primary current to the secondary current.

That the conductive element 110 can be dispersed as separate pieces throughout the printed circuit board 116 provides the designer with great flexibility as to where to place the conductive element 110 on the printed circuit board 116 depending on space available. A simple option is to configure the conductive element 110 as a single conductive pad to which a terminal of the semiconductor element 114 is soldered on the printed circuit board 116. As shown in FIG. 1, the conductive element 110 is in series with the electrical conductor 112. In this example, the conductive element 110 can be dimensioned to achieve a thermal mass determined according to a function that includes a ratio of the primary current to the secondary current and a heat capacity of the conductive material of the conductive element 110. The function can also include a thermal mass of the primary conductor and/or the energy dissipated from the electrical conductor 112 carrying secondary current due to ambient airflow across the electrical conductor 110, which airflow can be measured or modeled under test conditions. Another option is to break up the conductive element 110 into multiple, separate parts, which are all dimensioned and positioned such that the overall thermal mass of the conductive element 110, collectively with all of its component parts, results in the conductive element 110 heating or cooling at a rate that is commensurate with a rate of heating or cooling of the primary conductor 108. For example, if the printed circuit board 116 includes multiple layers, the parts of the conductive element 110 can be disposed on different layers of the printed circuit board 116. The combined effect of all of the parts of the conductive element 110 results in a thermal mass that is proportional to the thermal mass of the primary conductor in correlation with a ratio between the primary and secondary currents.

Instead of directly soldering a part of the conductive element 110 to the semiconductor element 114, the conductive element 110 can be placed sufficiently close to the electrical conductor 112 carrying the secondary current such that the heat generated by the secondary current passing through the electrical conductor 112 thermally couples to the nearby conductive element 110, heating or cooling the conductive element 110 at a rate commensurate with a rate of heating or cooling of the primary conductor 108.

As mentioned above, the semiconductor element 114 includes a p-n junction, whose voltage is known to vary with temperature. Electronic circuit breakers typically include a p-n junction electrically coupled to the secondary winding, typically in the form of a bridge rectifier or a bipolar junction transistor. Aspects of the present disclosure advantageously do not require adding any additional semiconductor element to an existing circuit breaker, but rather use an existing p-n junction and its known temperature dependency to exploit the p-n junction as a temperature sensor that models the rate of heating or cooling of the primary conductor by correlating a ratio of the primary current to the thermal mass of the primary conductor 108 with a ratio of the secondary current to the thermal mass of the conductive element 110. This p-n junction, for example, can be part of an integrated circuit chip, such as a bridge rectifier chip, having pins. One or more of these pins is connected (e.g., via soldering) to one or more parts of the conductive element. A bridge rectifier conventionally rectifies the secondary current into a corresponding direct current, which can be used to power electronics within the circuit breaker 100 responsible for sensing electrical faults and energizing a conventional solenoid (not shown) to trip the circuit breaker 100.

Alternately, the semiconductor element 114 can be a discrete diode in series with the electrical conductor 112. The secondary current from the secondary winding 104 passes through the electrical conductor 112 and correspondingly through the discrete diode 114, and both heat or cool as a function of the quantity of secondary current. The conductive element 110, which can be a copper pad, is soldered to the anode or cathode terminal of the discrete diode 114. If the semiconductor element 114 is not connected in series with the electrical conductor 112, it is preferable that a precise external current produced by a power supply, which is isolated from the secondary current, be supplied to the discrete diode 114 to provide accurate and reliable measurements of the junction built-in voltage of the diode.

r, the semiconductor element 114 can be a bipolar junction transistor having a terminal connected to the electrical conductor 112. The terminal is part of a p-n junction whose voltage varies with temperature. Like the discrete diode example above, the bipolar junction transistor can be supplied by a precise external current produced by a power supply that is isolated from the secondary current. By external, it is meant that the current supplied to the bipolar junction transistor is not supplied directly from the secondary winding 104 but rather by a power source that is isolated from the secondary winding 104, but may derive its current therefrom (e.g., through a current transformer).

Referring still to FIG. 1, as mentioned above, the built-in junction of the semiconductor element 114 produces a voltage $V_{PN}$ across the junction, which, in this example, is received by an electronic controller 124, which includes a memory 126. The memory 126 can be integrated with the controller 124, or the memory 126 can be external and electrically coupled to the controller 124. The memory 126 stores, in a memory location 128, data (e.g., a digital value) indicative of the voltage $V_{PN}$ across the junction. Conductive leads 128a,b are connected across the anode and cathode terminals of the p-n junction to be monitored, and are received at input pins of an A/D converter 130 of the controller 124. The controller 124 calculates, using the data indicative of the voltage $V_{PN}$, a corresponding temperature (in Celsius or equivalent) or heat (in Joules) using conventional techniques. This temperature or heat is indicative of the temperature or heat of the primary conductor 108, even though it is derived from a voltage across the p-n junction of the semiconductor element 114 coupled to the conductive element 110. This is because the thermal mass of the conductive element 110 is specifically designed to be correlated with the thermal mass of the primary conductor 108 using the ratio between the primary and secondary currents. Instead of using a memory 126 to store a value indicative of the $V_{PN}$ junction voltage, a comparator can compare the voltage $V_{PN}$ with a predetermined reference voltage to determine whether to generate a trip signal to cause the circuit breaker 100 to trip.

The trip module 118 or a comparator compares the temperature or heat calculated by the controller 124 using the stored or provided voltage $V_{PN}$ with a predetermined threshold, and based on the comparison determines whether to generate a trip signal on line 134 to cause the circuit breaker 100 to trip. If the voltage $V_{PN}$ falls below the predetermined threshold, the trip module 118 causes the circuit breaker 100 to trip. The circuit breaker 100 conventionally includes a tripping mechanism 132 for receiving the trip signal 134, which causes the circuit breaker 100 to trip, thereby disconnecting the load 120 being protected by the circuit breaker 100 from the power source 122. The controller 124 can be programmed at power-up to read the voltage $V_{PN}$ across the p-n junction of the semiconductor element 114 and determine, based on the voltage, a temperature value indicative of a temperature of the primary conductor 108. In this respect, a thermal history of the primary conductor 108 can be retained as heat in the conductive element 110 to provide robust thermal protection for the circuit breaker 100. If an operator attempts to turn the circuit breaker 100 on shortly after a thermal fault, the heat retained in the conductive element 110 will cause the voltage across the p-n junction of the semiconductor element 114 to reflect the elevated temperature levels, and the controller 124 can adjust its thermal (or long-time delay) trip curve to cause the circuit breaker 100 to trip in a shorter period of time. Alternately, if the measured voltage across the p-n junction of the semiconductor element 114 is below a predetermined threshold at power-up, the trip module 118 causes the circuit breaker 100 to trip immediately.

Figure 2:
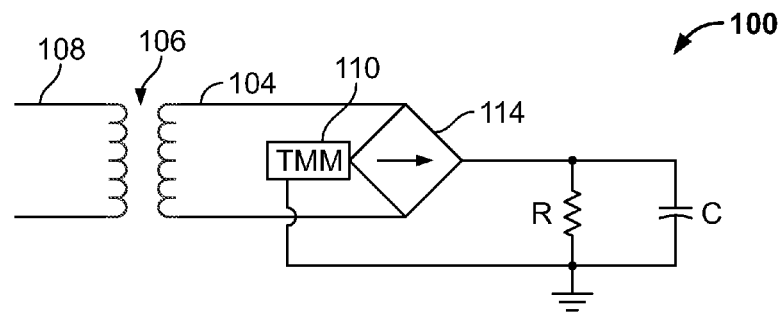
FIG. 2 is a functional diagram of a circuit breaker having a conductive pad connected to an input of a bridge rectifier.
Figure 3:
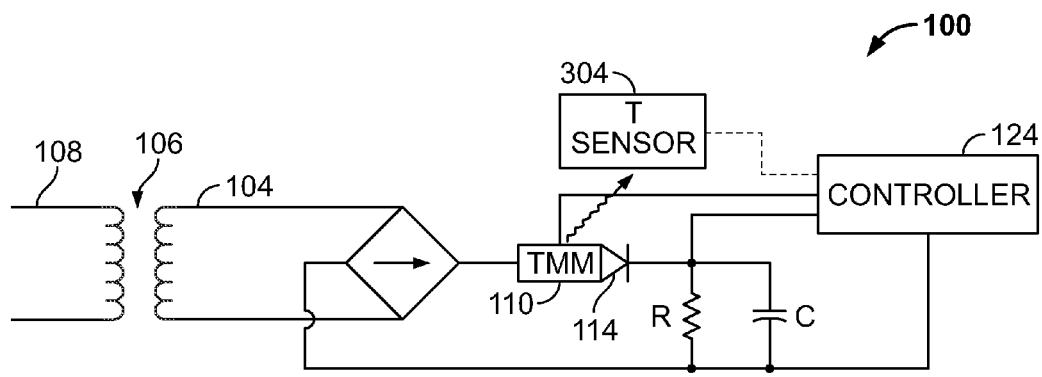
FIG. 3 is a functional diagram of a circuit breaker having a conductive pad connected to a discrete diode downstream of a bridge rectifier, and an optional temperature sensor for sensing ambient temperature.
Figure 4:
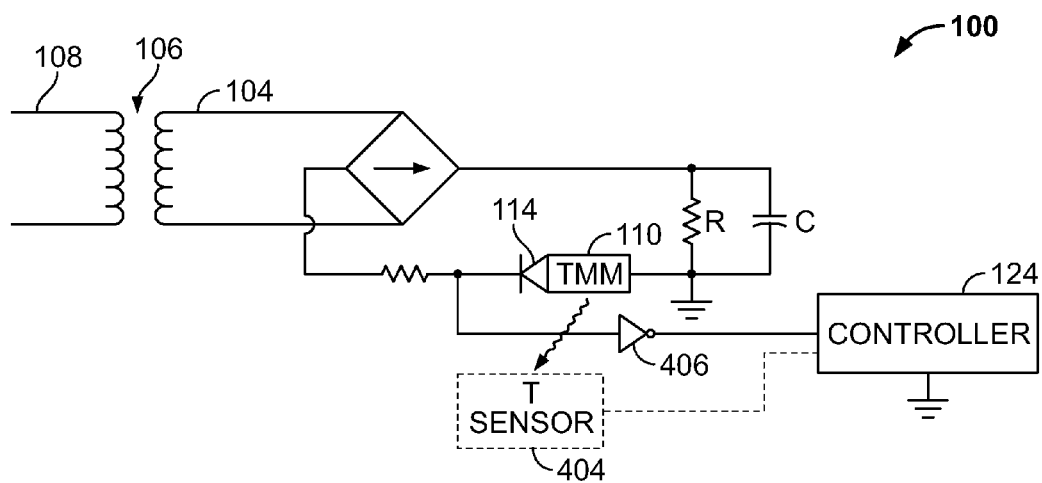
FIG. 4 is a functional diagram of a circuit breaker having a conductive pad connected to a discrete diode downstream of a bridge rectifier producing a negative voltage and an inverter connected to an input of a controller for reversing the negative voltage, and an optional temperature sensor for sensing ambient temperature.

FIGS. 2-4 are simplified functional block diagrams of the circuit breaker 100 showing the conductive element 110 in various configurations. In FIG. 2, the conductive element 110 is connected to the negative pin of the semiconductor element 114, which in FIG. 2 is a bridge rectifier. In FIG. 3, the conductive element 110 is connected to a terminal of the semiconductor element 114, which in FIG. 3 is a discrete diode. Alternately or additionally, an optional temperature sensor 304 can be positioned to sense ambient temperature within the circuit breaker 100. The difference between the ambient temperature reading from the temperature sensor 304 and the temperature calculated from the built-in junction voltage of the semiconductor element 114 provides a more accurate indication of the heat stored in the primary conductor 108 compared to one unreferenced temperature measurement. In FIG. 4, the conductive element 110 is connected to a terminal of the semiconductor element 114, which in FIG. 4 is a discrete diode. In the configuration of FIG. 4, the voltage across the built-in junction of the semiconductor element 114 will be negative, so an inverter 406 supplies a positive voltage to the controller 124 for conversion to a corresponding temperature value. An optional temperature sensor 404 can be used like the temperature sensor 304 shown in FIG. 3 to sense ambient temperature and to provide an accurate indication of the heat stored in the primary conductor 108. In implementations that use the optional temperature sensor 304, 404, the ambient temperature sensed by the temperature sensor 304, 404 can be subtracted from the temperature corresponding to the voltage across the p-n junction of the semiconductor element 114. It is known that the heat generated in the primary conductor 108 is proportional to the square of the current it is carrying. The thermal mass of the primary conductor 108 is proportional to the thermal mass of the secondary conductor 112, and the voltage across the p-n junction of the semiconductor element 114 is a function of the junction's temperature, assuming that the junction has excellent thermal conductivity with the thermal mass of the secondary conductor 112. The temperature of the secondary conductor 112 is a function of its thermal mass, so using the temperature corresponding to the voltage across the p-n junction together with the ambient temperature measured by the temperature sensor 304, 404, the amount of heat produced in the secondary conductor 112 can be calculated, and from that the heat in the primary conductor 108 can be calculated based on the known proportional relationship between the thermal masses of the primary and secondary conductors. Using the temperature sensor 304, 404, therefore, allows the circuit breaker 100 to detect short-time fault currents, such as those produced by a short circuit electrical fault for instantaneous protection, in addition to long-time fault currents for thermal protection.

Although a single-phase conductor is shown in FIG. 1, the aspects of the present disclosure are equally applicable to a multi-phase system. An optional temperature sensor, like the one shown in FIGS. 3 and 4, can be connected to the controller 124 shown in FIG. 1 and positioned to detect ambient temperature inside the circuit breaker, for accounting for ambient heat effects on the heat of the primary conductor 108. It should be emphasized that the return conductor is omitted in FIG. 1 for ease of illustration, but its thermal mass can also be accounted for in configuring the thermal mass of the conductive element 110.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A circuit breaker having a thermal sensor coupled to a secondary winding of a current transformer for modeling a temperature of a primary conductor carrying primary current to the circuit breaker, the circuit breaker comprising:

an electrically conductive element at least a part of which is coupled to an electrical conductor carrying secondary current from the secondary winding of a current transformer in the circuit breaker, the conductive element being dimensioned such that a thermal mass of the conductive element, determined according to a function that includes a ratio of the primary current to the secondary current and a heat capacity of the conductive material, models a rate of heating or cooling in the primary conductor; and a semiconductor element connected to at least part of the conductive element and providing a voltage across a p-n junction of the semiconductor element, the voltage varying as a function of a temperature of the conductive element.

2. The circuit breaker of claim 1, wherein a ratio of a thermal mass of the primary conductor to the determined thermal mass of the conductive element is proportional to the ratio of the primary current to the secondary current.

3. The circuit breaker of claim 1, wherein the function includes a thermal mass of the primary conductor.

4. The circuit breaker of claim 1, wherein the function includes energy dissipated from the electrical conductor carrying secondary current due to ambient airflow across the electrical conductor, which airflow cools the electrical conductor.

5. The circuit breaker of claim 1, further comprising a printed circuit board on which the conductive element and the semiconductor element are disposed, wherein the conductive element is a conductive pad in series with the electrical conductor carrying secondary current.

6. The circuit breaker of claim 5, wherein the semiconductor element is part of an integrated circuit chip having pins, at least one of the pins being connected to the conductive element.

7. The circuit breaker of claim 6, wherein the integrated circuit chip includes a bridge rectifier for rectifying the secondary current into a corresponding direct current.

8. The circuit breaker of claim 5, wherein the printed circuit board includes multiple layers, the conductive element including separate parts that are disposed on different ones of the multiple layers.

9. The circuit breaker of claim 1, wherein the semiconductor element is a discrete diode supplied by a fixed current produced by a power supply isolated from the secondary current.

10. The circuit breaker of claim 1, wherein the semiconductor element is a field-effect transistor or a bipolar junction transistor that includes the p-n junction, a fixed current being supplied to the transistor by a power supply isolated from the secondary current.

11. The circuit breaker of claim 1, wherein the conductive material is copper.

12. The circuit breaker of claim 1, wherein the conductive element comprises multiple, separate parts to provide the thermal mass, each part being positioned relative to the electrical conductor carrying the secondary current.

13. The circuit breaker of claim 1, wherein at least a part of the conductive element is physically coupled to the electrical conductor carrying the secondary current.

14. The circuit breaker of claim 1, wherein at least a part of the conductive element is thermally coupled to, but not physically contacting, the electrical conductor carrying the secondary current.

15. The circuit breaker of claim 1, further comprising:

a trip module that compares a temperature calculated using the voltage across the p-n junction with a predetermined threshold and based on the comparison determines whether to reduce the time delay before generating a trip signal that causes the circuit breaker to trip; and a tripping mechanism for receiving the trip signal, and responsive thereto, causing the circuit breaker to trip, thereby disconnecting a load being protected by the circuit breaker from the power source connected to the line terminals of the circuit breaker.

16. The circuit breaker of claim 1, further comprising:

a trip module that compares a temperature calculated using the voltage across the p-n junction with a predetermined threshold and based on the comparison determines whether to generate a trip signal for causing the circuit breaker to trip; and a tripping mechanism for receiving the trip signal, and responsive thereto, causing the circuit breaker to trip, thereby disconnecting a load being protected by the circuit breaker from the power source connected to the line terminals of the circuit breaker.

17. The circuit breaker of claim 15, wherein the circuit breaker is an electronic circuit breaker, and the trip module includes a microcontroller programmed to carry out the comparison and to determine whether to generate the trip signal, the trip module further including a memory that stores data indicative of the voltage across the p-n junction of the semiconductor element.

18. The circuit breaker of claim 16, wherein the microcontroller is further programmed to, upon power-up, read the voltage across the p-n junction and determine, based on the voltage, a temperature value indicative of a temperature of the primary conductor.

19. An electronic circuit breaker having a thermal sensor coupled to a secondary winding of a current transformer for modeling a temperature of a primary conductor carrying primary current to the circuit breaker, the electronic circuit breaker comprising:

an electrically conductive element at least a part of which is coupled to an electrical conductor carrying secondary current from the secondary winding of a current transformer in the circuit breaker, the conductive element having a thermal mass proportional to a thermal mass of the primary conductor, wherein a ratio of the primary current to the thermal mass of the primary conductor is correlated with a ratio of the secondary current to the thermal mass of at least the conductive element;

a semiconductor element connected to at least part of the conductive element and providing a voltage across a p-n junction of the semiconductor element, the voltage varying as a function of a temperature of the conductive element; and a controller that receives the voltage, calculates a temperature based on the voltage, and causes the circuit breaker to trip responsive to the temperature calculation.

* * * * *